US009684625B2

(12) United States Patent
Bak et al.

(10) Patent No.: US 9,684,625 B2
(45) Date of Patent: Jun. 20, 2017

(54) ASYNCHRONOUSLY PREFETCHING SHARABLE MEMORY PAGES (71) Applicant: Microsoft Technology Licensing, LLC, Redmond, WA (US)

(72) Inventors: Yevgeniy M. Bak, Redmond, WA (US); Mehmet Iyigun, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 14/221,829

(22) Filed: Mar. 21, 2014

(65) Prior Publication Data

US 2015/0269111 A1   Sep. 24, 2015

(51) Int. Cl.
| *G06F 13/42* | (2006.01) |
| *G06F 13/16* | (2006.01) |
| *G06F 13/18* | (2006.01) |
| *G06F 12/08* | (2016.01) |
| *G06F 12/0862* | (2016.01) |
| *G06F 9/44* | (2006.01) |

(52) U.S. Cl.
CPC .......... *G06F 13/4239* (2013.01); *G06F 12/08* (2013.01); *G06F 12/0862* (2013.01); *G06F 13/1663* (2013.01); *G06F 13/18* (2013.01); *G06F 9/4418* (2013.01); *G06F 2212/1016* (2013.01); *G06F 2212/6028* (2013.01); *G06F 2212/656* (2013.01)

(58) Field of Classification Search
CPC .. G06F 12/08; G06F 12/0862; G06F 13/1663; G06F 13/18; G06F 13/4239; G06F 2212/1016; G06F 2212/6028; G06F 2212/656; G06F 9/4418
See application file for complete search history.

(56) References Cited

U.S. PATENT DOCUMENTS

| 5,101,485 A | 3/1992 | Perazzoli, Jr. |
| 5,125,086 A | 6/1992 | Perazzoli |

(Continued)

FOREIGN PATENT DOCUMENTS

| CN | 100530142 | 8/2009 |
| EP | 0097256 | 1/1984 |

(Continued)

OTHER PUBLICATIONS

"International Search Report and Written Opinion", Application No. PCT/US2015/021129, May 28, 2015, 10 Pages.

(Continued)

*Primary Examiner* — Ann J Lo
*Assistant Examiner* — Jane Wei (57) ABSTRACT

When a process is swapped out of memory, a record of the sharable memory pages of the process is maintained. The sharable memory pages can then be repurposed. When the process is subsequently swapped back into memory, concurrently with the process running the sharable memory pages of the process are prefetched. If during this prefetching the process requests a memory page that is not currently in physical memory, a high priority I/O request is issued for that memory page. The high priority I/O request is placed at the front of an I/O queue, so the high priority I/O request is processed before the pending prefetch requests.

20 Claims, 5 Drawing Sheets

(56) References Cited

U.S. PATENT DOCUMENTS

| | | |
|---|---|---|
| 5,247,687 A | 9/1993 | Eilert et al. |
| 5,388,242 A | 2/1995 | Jewett |
| 5,394,537 A | 2/1995 | Courts et al. |
| 5,517,643 A | 5/1996 | Davy |
| 5,555,399 A | 9/1996 | Waldron et al. |
| 5,594,881 A | 1/1997 | Fecteau |
| 5,628,023 A | 5/1997 | Bryant |
| 5,696,926 A | 12/1997 | Culbert |
| 5,758,174 A | 5/1998 | Crump |
| 5,802,599 A | 9/1998 | Cabrera et al. |
| 5,826,057 A | 10/1998 | Okamoto et al. |
| 5,966,735 A | 10/1999 | Noel et al. |
| 6,128,713 A | 10/2000 | Eisler et al. |
| 6,298,422 B1 | 10/2001 | Spilo et al. |
| 6,330,572 B1 | 12/2001 | Sitka |
| 6,349,372 B1 | 2/2002 | Benveniste |
| 6,442,664 B1 | 8/2002 | Maynard et al. |
| 6,473,842 B1 | 10/2002 | Tsutsumi |
| 6,496,909 B1 | 12/2002 | Schimmel |
| 6,496,912 B1 | 12/2002 | Fields, Jr. et al. |
| 6,516,397 B2 | 2/2003 | Roy |
| 6,564,305 B1 | 5/2003 | Moore |
| 6,681,239 B1 | 1/2004 | Munroe et al. |
| 6,877,081 B2 | 4/2005 | Herger |
| 6,956,507 B2 | 10/2005 | Castelli et al. |
| 6,968,424 B1 | 11/2005 | Danilak |
| 7,024,512 B1 | 4/2006 | Franaszek et al. |
| 7,185,155 B2 | 2/2007 | Sechrest et al. |
| 7,197,590 B2 | 3/2007 | Chiu |
| 7,437,529 B2 | 10/2008 | Burugula et al. |
| 7,475,183 B2 | 1/2009 | Traut et al. |
| 7,587,572 B1 | 9/2009 | Stenstrom |
| 7,610,437 B2 | 10/2009 | Sinclair et al. |
| 7,624,240 B1 | 11/2009 | Colbert et al. |
| 7,698,513 B2 | 4/2010 | Sechrest et al. |
| 7,797,510 B1 | 9/2010 | Case et al. |
| 7,895,242 B2 | 2/2011 | Ergan |
| 8,015,367 B1 | 9/2011 | Rao et al. |
| 8,099,568 B2 | 1/2012 | Colbert et al. |
| 8,386,740 B2 | 2/2013 | Devendra et al. |
| 8,484,405 B2 | 7/2013 | Mashtizadeh et al. |
| 8,495,267 B2 | 7/2013 | Abali et al. |
| 8,516,005 B2 | 8/2013 | Ergan et al. |
| 8,539,186 B2 | 9/2013 | Sechrest et al. |
| 8,832,411 B2 | 9/2014 | Iyigun et al. |
| 9,081,702 B2 | 7/2015 | Iyigun et al. |
| 9,632,924 B2 | 4/2017 | Bak et al. |
| 2002/0073298 A1 | 6/2002 | Geiger et al. |
| 2002/0147893 A1 | 10/2002 | Roy et al. |
| 2003/0037060 A1 | 2/2003 | Kuehnel |
| 2003/0061457 A1 | 3/2003 | Geiger et al. |
| 2003/0079081 A1 | 4/2003 | Okada |
| 2004/0030847 A1 | 2/2004 | Tremaine |
| 2004/0068627 A1* | 4/2004 | Sechrest ............... G06F 12/122 711/158 |
| 2005/0132161 A1 | 6/2005 | Makela et al. |
| 2006/0161912 A1 | 7/2006 | Barrs et al. |
| 2007/0005911 A1 | 1/2007 | Yang |
| 2007/0101108 A1 | 5/2007 | Grossman et al. |
| 2007/0156386 A1 | 7/2007 | Guenthner |
| 2009/0112949 A1 | 4/2009 | Ergan |
| 2009/0327621 A1 | 12/2009 | Kliot et al. |
| 2011/0072235 A1 | 3/2011 | Deming et al. |
| 2011/0107007 A1 | 5/2011 | van Riel et al. |
| 2011/0113432 A1 | 5/2011 | Ergan et al. |
| 2011/0153978 A1 | 6/2011 | Chalemin et al. |
| 2011/0238943 A1 | 9/2011 | Devendran et al. |
| 2011/0271070 A1* | 11/2011 | Worthington ....... G06F 12/1009 711/165 |
| 2012/0036325 A1 | 2/2012 | Mashtizadeh et al. |
| 2012/0151127 A1 | 6/2012 | Lim |
| 2012/0233438 A1* | 9/2012 | Bak .................... G06F 12/0223 2/223 |
| 2012/0239899 A1 | 9/2012 | Adderly et al. |
| 2013/0031293 A1 | 1/2013 | Van Riel |
| 2013/0036299 A1 | 2/2013 | Itoh |
| 2013/0159662 A1 | 6/2013 | Iyigun et al. |
| 2013/0160011 A1 | 6/2013 | Corrie |
| 2013/0326170 A1 | 12/2013 | Kilari et al. |
| 2014/0006745 A1 | 1/2014 | Fontenot et al. |
| 2014/0052946 A1 | 2/2014 | Kimmel |
| 2014/0149634 A1 | 5/2014 | Tosatti et al. |
| 2014/0164686 A1 | 6/2014 | Choi et al. |
| 2014/0189195 A1 | 7/2014 | Chen et al. |
| 2014/0189281 A1 | 7/2014 | Sokol, Jr. |
| 2014/0244603 A1 | 8/2014 | Arges et al. |
| 2014/0282589 A1 | 9/2014 | Kuang et al. |
| 2014/0351552 A1 | 11/2014 | Iyigun et al. |
| 2014/0372715 A1 | 12/2014 | Bak et al. |
| 2015/0106582 A1 | 4/2015 | Mai et al. |
| 2015/0178222 A1 | 6/2015 | Hopper et al. |
| 2015/0242432 A1 | 8/2015 | Bak et al. |
| 2016/0259720 A1 | 9/2016 | Bak et al. |
| 2016/0306738 A1 | 10/2016 | Bak et al. |

FOREIGN PATENT DOCUMENTS

| | | |
|---|---|---|
| EP | 0346039 | 12/1989 |
| EP | 0723229 | 7/1996 |
| EP | 1406174 | 4/2004 |
| KR | 102011008598 | 7/2011 |
| KR | 101221241 | 1/2013 |
| WO | WO-9518997 | 7/1995 |

OTHER PUBLICATIONS

"Notice of Allowance", U.S. Appl. No. 14/456,128, Mar. 6, 2015, 8 pages.

"International Search Report and Written Opinion", Application No. PCT/US2015/016237, Nov. 5, 2015, 10 pages.

"Non-Final Office Action", U.S. Appl. No. 13/917,149, Oct. 23, 2015, 17 pages.

"Foreign Office Action", CN Application No. 201210540976.9, Dec. 3, 2014, 13 Pages.

"Non-Final Office Action", U.S. Appl. No. 14/456,128, Oct. 7, 2014, 5 pages.

"International Search Report and Written Opinion", Application No. PCT/US2013/060505, Feb. 7, 2014, 10 pages.

"Notice of Allowance", U.S. Appl. No. 13/326,182, Jul. 2, 2014, 7 Pages.

"Final Office Action", U.S. Appl. No. 13/042,128, Nov. 21, 2013, 15 pages.

"HP OpenVMS System Services Reference Manual", Retrieved from <http://h71000www7.hp.com/doc/83final/4527/4527pro_022.html>> on Dec. 1, 2011, 7 pages.

"International Search Report and Written Opinion", Application No. PCT/US2012/069602, May 30, 2013, 10 pages.

"Microsoft "Working Set"", Retrieved from <<http://msdn.microsoft.com/en-us/library/windows/desktop/cc441804%28d=printer,v=vs.85%29>> May 22, 2014, 2 pages.

"Non Final Office Action", U.S. Appl. No. 13/042,128, May 2, 2014, 13 pages.

"Non-Final Office Action", U.S. Appl. No. 11/933,364, Jul. 22, 2010, 10 pages.

"Non-Final Office Action", U.S. Appl. No. 13/006,229, Oct. 1, 2012, 15 pages.

"Non-Final Office Action", U.S. Appl. No. 13/006,229, May 25, 2012, 6 pages.

"Non-Final Office Action", U.S. Appl. No. 13/042,128, Apr. 3, 2013, 12 pages.

"Non-Final Office Action", U.S. Appl. No. 13/326,182, Aug. 16, 2013, 5 pages.

"Notice of Allowance", U.S. Appl. No. 11/933,364, Nov. 16, 2010, 6 pages.

"Notice of Allowance", U.S. Appl. No. 13/006,229, Apr. 4, 2013, 12 pages.

"Notice of Allowance", U.S. Appl. No. 13/326,182, Jan. 15, 2014, 7 Pages.

(56) References Cited

OTHER PUBLICATIONS

"Notice of Allowance", U.S. Appl. No. 13/326,182, May 9, 2014, 7 Pages.
"Supplemental Notice of Allowance", U.S. Appl. No. 13/006,229, Jul. 9, 2013, 2 pages.
"Understanding Memory Resource Management in VMware ESX 4.1", Retrieved from <http://www.vmware.com/files/pdf/techpaper/vsp_41_perf_memory_mgmt.pdf> on Mar. 21, 2013, 2010, 25 pages.
"Working Set", Retrieved From: ,http://msdn.microsoft.com/en-us/library/windows/desktop/cc441804(v=vs.85).aspx> Feb. 19, 2014, Nov. 16, 2013, 1 Page.
Azimi, et al., "PATH: Page Access Tracking to Improve Memory Management", Proc. 6th Intl Symposium on Memory Management, Oct. 2007, 10 pages.
Carp, "The Standby List and Storage Overprovisioning", Retrieved from <http://fsfilters.blogspot.in/2012/04/standby-list-and-storage.html> on Mar. 22, 2013, Apr. 19, 2012, 5 pages.
Clark, et al., "Selective Page Updating", IP.com Prior Art Database Technical Disclosure, 1987, 3 Pages.
De et al., "Adaptive Compressed Caching: Design and Implementation", IEEE, Retrieved from <http://linuxcompressed.sourceforge.net/docs/files/paper.pdf>, 2003, 15 pages.
Dilger, "Compressed Memory in OS X 10.9 Mavericks Aims to Free RAM, Extend Battery Life", Retrieved From: <http://appleinsider.com/articles/13/06/12/compressed-memory-in-os-x-109-mavericks-aims-to-free-ram-extend-battery-life> Jan. 22, 2014, Jun. 12, 2013, 10 Pages.
Freedman, et al., "The Compression Cache: Virtual Memory Compression for Handheld Computers", MIT Lab for Computer Science, Retrieved from <http://www.scs.stanford.edu/mfreed/docs/6.033/compression.pdf>, Mar. 16, 2000, 16 pages.
Gupta, "Compcache: In-Memory Compressed Swapping", Retrieved from <http://lwn.net/Articles/334649/> on Mar. 20, 2013, May 26, 2009, 6 pages.
Jenner, et al., "Address Space Suballocation in a Virtual Storage Environment", IP.com Prior Art Database Technical Disclosure, 1973, 6 Pages.
Russinovich, "Inside the Windows Vista Kernel: Part 2", Retrieved from <http://technet.microsoft.com/en-us/magazine/2007.03.vistakernel.aspx> on Mar. 21, 2013, Mar. 2007, 8 pages.
Speight, et al., "Delphi: Prediction-Based Page Prefetching to Improve the Performance of Shared Virtual Memory Systems", In Proceedings: International Conference on Parallel and Distributed Processing Techniques and Applications, Jul. 25, 2013, 7 Pages.
Tuduce, "Adaptive Main Memory Compression", Doctoral Dissertation, Swiss Federal Institute of Technology Zurich, Available at <http://www.lst.ethz.ch/research/publications/DISS_ETH_16327/DISS_ETH_16327.pdf>, 2005, 141 pages.
Tuduce, et al., "Adaptive Main Memory Compression", Retrieved from <http://www.lst.inf.ethz.ch/research/publications/publications/USENIX_2005/USENIX_2005.pdf>, 2005, 14 pages.
Wilson, et al.,"The Case for Compressed Caching in Virtual Memory Systems", USENIX Association, Jun. 6-11, 1999. Retrieved from <http://www.usenix.org/events/usenix99/full_papers/wilson/wilson.pdf>, 1999, 33 pages.
"Final Office Action", U.S. Appl. No. 13/917,149, Jun. 13, 2016, 20 pages.
"Non-Final Office Action", U.S. Appl. No. 14/635,302, Aug. 15, 2016, 9 pages.
"Commit Charge", Retrieved from the internet at: http://web.archive.org/web/20150225012244/http://en.wikipedia.org/wiki/Commit_charge—on Apr. 28, 2016, 2 pages.
"Hack 92 Getting the Most Out of Your RAM", Retrieved from <http://www.csie.ntu.edu.tw/~b90047/ebook/winXPhack/0596005113_winxphks-chp-11-sect-3.html> on Oct. 28, 2014, May 8, 2007, 3 pages.
"How to determine the appropriate page file size for 64-bit versions of Windows", Retrieved from <> on Oct. 28, 2014, Nov. 27, 2013, 3 pages.
"How VMware vSphere is saving physical memory?", Retrieved from <http://www.unixarena.com/2014/07/how-vmware-vsphere-is-saving-physical-memory.html> on Oct. 28, 2014, Jul. 31, 2014, 3 pages.
"International Preliminary Report on Patentability", Application No. PCT/US2015/021129, Feb. 29, 2016, 6 pages.
"International Preliminary Report on Patentability", Application No. PCT/US2015/016237, Feb. 23, 2016, 8 pages.
"International Search Report and Written Opinion", Application No. PCT/US2016/024597, May 18, 2016, 12 pages.
"International Search Report and Written Opinion", Application No. PCT/US2016/018559, May 18, 2016, 14 pages.
"VMware vSphere 4—ESX and vCenter Server—Memory Compression", Retrieved from <http://pubs.vmware.com/vsphere-4-esx-vcenter/index.jsp?topic=/com.vmware.vsphere.resourcemanagement.doc_41/managing_memory_resources/c_memory_compression.html> on Oct. 28, 2014, 2009, 1 page.
Denneman,"Disable ballooning?", Retrieved from <http://frankdenneman.nl/2010/11/29/disable-ballooning/> on Oct. 28, 2014, Nov. 29, 2010, 12 pages.
Huffman,"How to Size Page Files on Windows Systems", Retrieved from <http://mcpmag.com/articles/2011/07/05/sizing-page-files-on-windows-systems.aspx> on Oct. 28, 2014, Jul. 5, 2011, 9 pages.
Russinovich,"Pushing the Limits of Windows: Virtual Memory", Retrieved from <http://blogs.technet.com/b/markrussinovich/archive/2008/11/17/3155406.aspx> on Oct. 28, 2014, Nov. 17, 2008, 10 pages.
"Non-Final Office Action", U.S. Appl. No. 14/187,031, Nov. 30, 2016, 18 pages.
"Notice of Allowance", U.S. Appl. No. 14/635,302, Dec. 28, 2016, 5 pages.
"International Preliminary Report on Patentability", Application No. PCT/US2016/024597, Aug. 23, 2016, 6 pages.
"International Preliminary Report on Patentability", Application No. PCT/US2016/018559, Aug. 24, 2016, 7 pages.
"Non-Final Office Action", U.S. Appl. No. 14/685,977, Sep. 15, 2016, 11 pages.
"Final Office Action", U.S. Appl. No. 14/685,977, Mar. 7, 2017, 13 pages.
"Foreign Office Action", EP Application No. 13773957.9, Feb. 27, 2017, 7 pages.

* cited by examiner

ASYNCHRONOUSLY PREFETCHING SHARABLE MEMORY PAGES

BACKGROUND

As computer technology has advanced, the performance of computer processors has increased. The performance of such computer processors, however, is sometimes hindered by other bottlenecks in the computer. For example, the amount of random access memory (RAM) available to running processes is a bottleneck in computer performance. One way to reduce the impact of bottlenecks in the computer is to increase the amount of RAM. However, RAM remains costly, and thus adding RAM to the computer can be problematic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one or more candidate sharable memory pages for a process of a computing device being swapped from memory are identified. The one or more candidate sharable memory pages include memory pages sharable by the process with one or more other processes of the computing device. A record identifying the one or more candidate sharable memory pages is maintained, and a memory manager is allowed to repurpose the one or more candidate sharable memory pages after the one or more candidate sharable memory pages have been recorded.

In accordance with one or more aspects, a computing device includes a memory, a storage device, and a memory manager. The memory manager is configured to swap a process of the computing device into the memory, the process using one or more sharable memory pages that are sharable with other processes of the computing device. The memory manager is further configured to allow the process to resume running, and asynchronously prefetch the one or more sharable memory pages while the process is running.

BRIEF DESCRIPTION OF THE DRAWINGS

The same numbers are used throughout the drawings to reference like features.

DETAILED DESCRIPTION

Asynchronously prefetching sharable memory pages is discussed herein. A memory in a system is made up of multiple blocks or portions referred to as memory pages (or simply pages). Some memory pages are sharable by multiple programs in the system, and these memory pages can be backed by files in the file system or by a page file. A sharable memory page refers to a memory page that can be shared by multiple programs in the system, regardless of whether the memory page is actually being shared by multiple programs in the system at any given time. When a program is to be out-swapped, a record of the sharable memory pages is maintained. The sharable memory pages can then be repurposed (after being written to the page file or their backing file, if the sharable memory pages are dirty). For other memory pages, such as private memory pages of the program, space in a page file can optionally be reserved and such memory pages optionally written out to the page file at a later time.

When an out-swapped program is to be subsequently in-swapped, the program is allowed to run, optionally after other memory pages (such as private memory pages) of the program are read from the page file. Concurrently with the program running, I/O (input/output) requests to prefetch the sharable memory pages of the program are issued. These I/O requests are maintained in an I/O queue. If the program requests a memory page that is not currently in physical memory, a high priority I/O request is issued for that memory page. The high priority I/O request is placed at the front of the I/O queue, or otherwise handled appropriately, so that the high priority I/O request is processed before other I/O requests in the I/O queue. If a prefetch I/O request for the memory page is already in the I/O queue, that I/O request is subsequently allowed to be performed, and the returned data can simply be dropped or otherwise handled appropriately.

Figure 1:
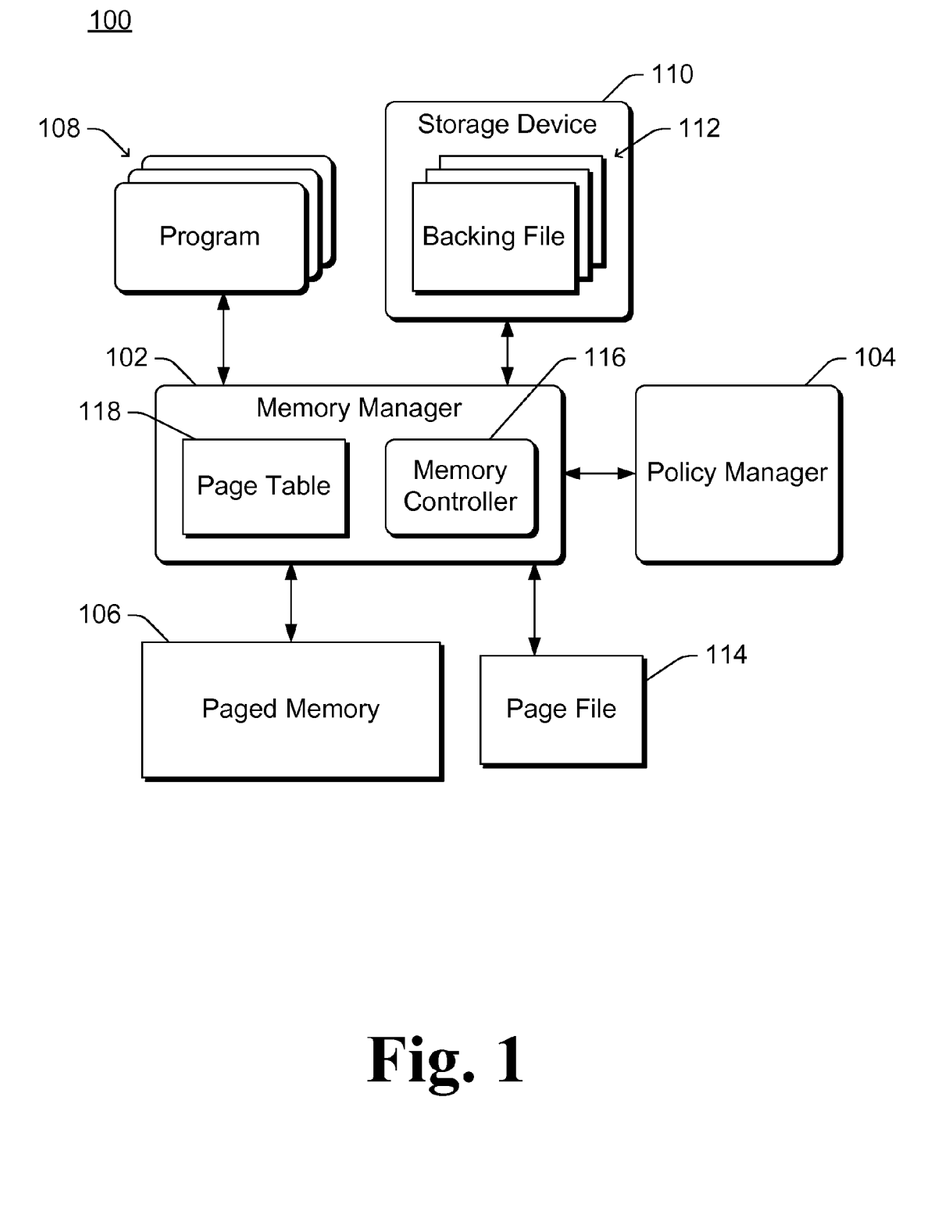
FIG. 1 illustrates an example system employing asynchronously prefetching sharable memory pages in accordance with one or more embodiments.

FIG. 1 illustrates an example system 100 employing asynchronously prefetching sharable memory pages in accordance with one or more embodiments. The system 100 includes a memory manager 102, a policy manager 104, and paged memory 106. Generally, the memory manager 102 manages storage of data in the paged memory 106. The memory manager 102 allocates portions of the paged memory 106 to various programs 108 in the system 100. A program 108, when running, is also referred to herein as a process (which is an instance of a running program 108), so portions of the paged memory 106 allocated to a program 108 are also referred to as allocated to a process of the program 108. The programs 108 can be applications, operating system programs, or other components or modules. The memory manager 102 receives requests from these programs 108 to retrieve data from the paged memory 106 and to write data to the paged memory 106. The paged memory 106 can be, for example, any type of CPU (Central Processing Unit) addressable memory, such as volatile memory (e.g., RAM) or nonvolatile memory (e.g., Flash memory).

Memory manager 102 manages paged memory 106 using paging. The memory manager 102 organizes the memory 106 (e.g., RAM) into pages, which are a particular (e.g., fixed) size unit of data. The act of paging refers to reading data in units of pages from the backing file 112 or page file 114 in system 100 when the data is not in the memory 106. The act of paging also refers to writing dirty (modified) data back in units of pages into the backing file 112 or page file 114. The memory pages are thus also referred to as file backed memory pages or page file backed memory pages. Such paging techniques are well known to those skilled in the art.

The system 100 also includes a storage device 110. The storage device 110 is a secondary storage device in the system 100 (secondary to memory 106), and in one or more embodiments has slower read/write times but larger storage capacity than the paged memory 106. The storage device 110 can be, for example, Flash memory (e.g., a solid state disk (SSD)) or magnetic disk. One or more backing files 112 are stored on the storage device 110. The one or more backing files 112 can back some of the memory pages of the paged memory 106, such as sharable memory pages, storing the content (e.g., data or instructions) that is included in a memory page. If a memory page of the paged memory 106 is repurposed, the content of the memory page can be read back into the paged memory 106 from the backing file 112 that the memory page is backed by. The backing files can take any of a variety of forms, such as library files (e.g., dynamic link libraries), binary or other executable files, and so forth.

The system 100 also includes a page file 114 in which memory pages can be stored. The page file can be included in the memory 106 (e.g., RAM) or on the storage device 110. Although a single page file 114 is illustrated in FIG. 1, it should be noted that multiple page files can be included in the system 100. Sharable memory pages are typically backed by a backing file 112, but can alternatively be backed by the page file 114. It should be note that in the discussions herein referring to the sharable memory pages being backed by a backing file 112, the sharable memory pages can alternatively be backed by a page file 114.

The memory manager 102 includes a memory controller 116 that operates to carry out the functionality of the memory manager 102, and a page table 118 that is a record of various information regarding memory pages of the paged memory 106. The page table 118 includes information indicating where memory pages are stored at any given time. Memory pages are typically stored in physical memory (paged memory 106) or on the secondary storage device 110. Memory pages stored on the secondary storage device 110 can be stored in a page file or other file that they are backed by (a backing file 112). For memory pages stored in physical memory, the memory manager 102 accesses the memory pages directly. For memory pages stored on storage device 110, the memory manager 102 issues I/O requests to the storage device 110 to retrieve the memory pages from the appropriate file and stores the memory pages in physical memory. Alternatively, the memory manager 102 may issue I/O requests to other components that in turn manage retrieval of memory pages from the storage device 110, such as a compression module that manages compressed storage of memory pages on the storage device 110 (or alternatively elsewhere).

The paged memory 106 includes multiple pages that can each be classified as one of multiple different types of pages at any given time, and this classification can change over time. One type of memory page is a memory page that has been allocated to a program 108 and is currently being used by the program 108, and this type of memory page is referred to as a working set page (or alternatively an assigned page) in the working set of a process of the program 108 (also referred to as the working set of the program 108). A memory page currently being used refers to a memory page that has been accessed by the program 108 within a threshold amount of time (e.g., the previous 20 seconds), or is otherwise being accessed by the program 108 in such a manner that the memory page is not to be repurposed by the memory manager 102. Repurposing a memory page refers to the memory page being re-used by the memory manager 102 for something else, such as storing different data for the same or a different program or for other use in the system. A memory page can be repurposed by, for example, being allocated to a different program, and so forth.

Another type of memory page is a memory page that has been allocated to a program 108 and is not currently being used by the program 108, and this type of memory page is referred to as a standby page (or alternatively a re-assignable page). A memory page not currently being used refers to a page the contents of which have not been modified (or has been written to the page file 114 or backing file 112 since last modification) and that has not been accessed by the program 108 within a threshold amount of time (e.g., the previous 20 seconds), or is otherwise being accessed by the program 108 in such a manner that the memory page can be repurposed by the memory manager 102.

Another type of memory page is a memory page the contents of which have been modified but not yet copied to the page file 114 or backing file 112, and this type of memory page is referred to as a modified page (or alternatively a dirty page). A modified memory page is not to be repurposed by the memory manager 102. However, after storing a modified memory page in the page file 114 or backing file 112, the classification of the memory page can be changed (e.g., to a standby page or a free page).

Another type of memory page is a memory page that is not currently allocated to a program 108, and with which the memory manager 102 can do anything (including being repurposed). This type of memory page is referred to as a free page (or alternatively de-allocated page).

The memory manager 102 uses various rules or criteria to determine when memory pages of the paged memory 106 are allocated to programs 108, which memory pages are allocated to which programs 108, which memory pages previously allocated to a program 108 are to be repurposed, and so forth. The memory manager 102 also determines the classification for types of memory pages, changing the classifications of memory pages as appropriate. In one or more embodiments, the memory manager 102 maintains a list or other record of which memory pages of the paged memory 106 are classified as which type of page. For example, the memory manager 102 can maintain a list or other record of working set pages, a list or other record of standby pages, a list or record of modified pages, a list or record of free pages, and so forth.

Memory pages can also be referred to as private pages or sharable pages. Private pages are memory pages that are owned by or dedicated to a particular process and are used by that particular process and no other process. Sharable pages are memory pages that can be shared by multiple processes and can be used by each of the multiple processes. At any given time, a sharable memory page can be used by one or more processes. For sharable memory pages, the physical memory where the memory pages are stored at a given time can be mapped to address spaces of multiple processes. For private memory pages, however, the physical memory where the memory pages are stored at a given time is mapped to the address space of just the process that owns the memory pages.

The system 100 represents one or more devices. In one or more embodiments, the components 102, 104, 106, and 110 illustrated in the system 100 are included as part of the same computing device. Alternatively, these components can be spread across two or more devices.

A determination is made when to out-swap sharable memory pages of a program from memory or in-swap sharable memory pages of a program into memory. Such determinations can be made by the memory manager 102, or by another component (e.g., the policy manager 104 as discussed above, or alternatively other components running in a kernel mode or a user mode) that notifies memory manager 102 of the determination. Out-swapping (also referred to as swapping out) sharable memory pages of a program refers to allowing at least some of the sharable memory pages of a process that is a running instance of the program to be removed from the working set (or address space) of the process, thus making the sharable memory pages available for repurposing. A record of the set of addresses of the sharable memory pages in the process address space is maintained so that the memory pages can be later in-swapped. Out-swapping the sharable memory pages of a program is also referred to as out-swapping the sharable memory pages of the process that is a running instance of the program.

In-swapping (also referred to as swapping in) sharable memory pages of a program refers to retrieving at least some of the sharable memory pages for a process that is a running instance of the program from a backing file 112 and/or a page file 114, and placing the memory pages in physical memory. In-swapping sharable memory pages of a program is also referred to as in-swapping sharable memory pages of the process that is a running instance of the program.

It should be noted that sharable memory pages are typically not modified and thus typically can be repurposed without being written back to a backing file 112. However, if sharable memory pages are modified then they are written to a backing file 112 (or alternatively the page file 114) prior to being repurposed. It should be noted that because the sharable memory pages can be shared by multiple processes, there is typically no single contiguous block that the sharable memory pages could be stored as part of—the other memory pages in such a contiguous block would have to be different for the different processes that share the sharable memory pages.

In one or more embodiments, private memory pages of a process can be out-swapped as well. A record of the private memory pages is maintained, and the private memory pages are written to the page file 114 in a contiguous block, allowing the memory pages to be written to (and when subsequently in-swapping the pages allowing the pages to be read from) the page file 114 efficiently using sequential writes and reads. For example, the total size of the private memory pages can be calculated, then space reserved in the page file 114 sufficient to store the private memory pages. Further, a location for each private memory page can be reserved in the reserved space, the locations sequentially ordered according to the virtual address order of the private memory pages. In one or more write operations, each of the private memory pages is written to its particular reserved location in the reserved space of the page file 114. Although the private memory pages may be non-contiguous in the working set they are written into contiguous locations in the page file 114. The private memory pages of a process can be in-swapped by reading the private memory pages from the page file 114 and placing the private memory pages in physical memory. The writing of candidate pages into a contiguous, sequentially ordered, reserved space when out-swapping may enable a subsequent read operation to read a large, sequentially ordered block of the page file 114 when the pages are read back into working set during a subsequent in-swapping operation.

Although private memory pages of a process can be out-swapped and in-swapped, the techniques discussed herein can operate independently of any such out-swapping or in-swapping of private memory pages. The techniques discussed herein can be used regardless of whether the private memory pages of a process are out-swapped or in-swapped.

Figure 2:
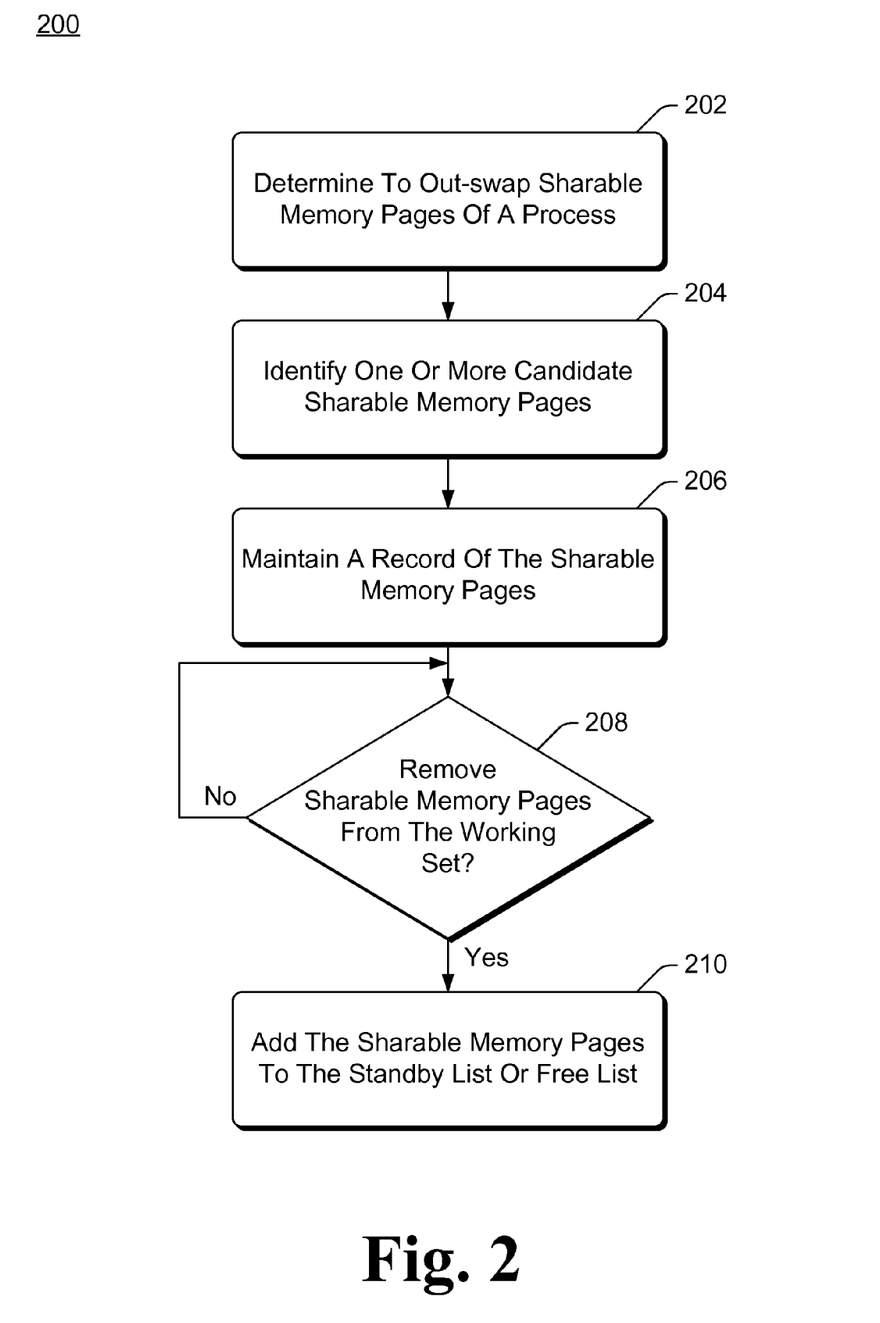
FIG. 2 is a flowchart illustrating an example process for out-swapping sharable memory pages of a process in accordance with one or more embodiments.

FIG. 2 is a flowchart illustrating an example process 200 for out-swapping sharable memory pages of a process in accordance with one or more embodiments. Process 200 is carried out by a memory manager or other operating system module, such as memory manager 102 of FIG. 1, and can be implemented in software, firmware, hardware, or combinations thereof. Process 200 is shown as a set of acts and is not limited to the order shown for performing the operations of the various acts. Process 200 is an example process for out-swapping sharable memory pages of a process; additional discussions of out-swapping sharable memory pages of a process are included herein with reference to different figures.

In process 200, a determination is made to swap out sharable memory pages of a process (act 202). This determination can be made (e.g., by the policy manager 104, or alternatively another module such as the memory manager 102) based on various criteria, such as a determination that the process is inactive or suspended, that one or more threads associated with the process have not been active for a particular amount of time, that the process has been in the background for a particular amount of time, that the process has not used a certain number of pages during a particular amount of time, that the system as a whole has been suspended or is inactive, and so forth. The determination can also be made based on other criteria, such as a determination that a request to swap out the process is received from the process (e.g., for the process to record a save point of the current memory state of the process), that a current user of the system is logging out of the system, that a display of the process has been minimized, and so forth.

One or more candidate sharable memory pages are identified (act 204). In one or more embodiments, the memory manager 102 analyzes each sharable memory page of the process and determines whether each sharable memory page is a candidate for out-swapping based on certain criteria. The criteria can indicate, for example, that sharable pages that are in the working set of the process are candidates for out-swapping. Alternatively, other criteria can be used. For example, the criteria can indicate that sharable memory pages that are in the address space of the process are candidates for out-swapping regardless of whether the sharable memory pages are in the working set of the process. By way of another example, the criteria can indicate that sharable memory pages that are in the address space of the process but not in the working set of the process are candidates for out-swapping. By way of another example, the criteria can indicate that sharable memory pages that are not dirty are candidates for out-swapping. The criteria can also be history based. For example, the sharable memory pages that are typically (e.g., at least a threshold percentage of the time) accessed by a process when it resumes running after being swapped in can be identified (e.g., by the policy manager 104), and those identified sharable memory pages can be the candidate sharable memory pages.

A record of the sharable memory pages identified in act 204 is maintained (act 206). The record of the sharable memory pages can take various forms, and is an indication of the sharable memory pages identified in act 204. The record can be, for example, a list of virtual addresses of the identified sharable memory pages generated in act 206.

Process 200 continues based on whether there is a determination to remove sharable memory pages from the working set (act 208). Such a determination can be made in various manners, such as a determination by the memory manager 102 that due to memory pressure some of the physical memory is to be made available. The policy manager 104 or memory manager 102 can alternatively use various other policies or criteria to make this determination. Alternatively, a user mode service or other component can instruct the memory manager when to remove sharable memory pages from the paged memory 106 so that the sharable memory pages can be repurposed.

In response to a determination that there is a desire to remove sharable memory pages from the working set, one or more of the sharable memory pages of the process are removed from the working set (act 210). The sharable memory pages removed from the working set are added to the standby list or free list, after which the memory pages can be repurposed as desired by the memory manager. All of the sharable memory pages in the record maintained in act 206 can be removed from the working set, or a subset of those sharable memory pages can be removed from the working set. Any of a variety of policies or criteria can be used to determine which subset of the sharable memory pages are to be removed from the working set.

In one or more embodiments, situations can arise in which one or more of the sharable memory pages have been modified (are dirty). In such situations, the one or more sharable memory pages that have been modified are written back to the backing file 112 that backs the one or more sharable memory pages prior to being added to the standby list or free list in act 210.

Figure 3:
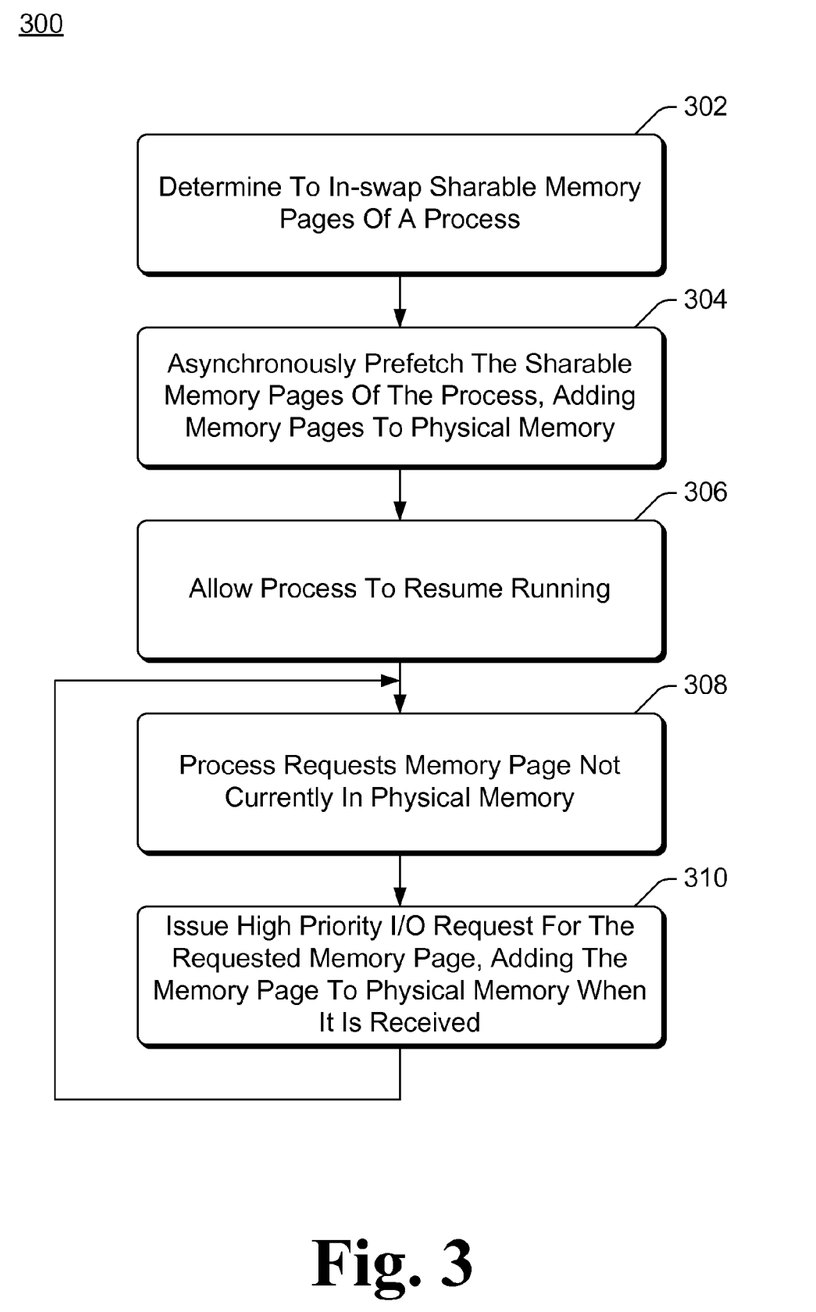
FIG. 3 is a flowchart illustrating an example process for in-swapping sharable memory pages of a process in accordance with one or more embodiments.

FIG. 3 is a flowchart illustrating an example process 300 for in-swapping sharable memory pages of a process in accordance with one or more embodiments. Process 300 is carried out by a memory manager or other operating system module, such as memory manager 102 of FIG. 1, and can be implemented in software, firmware, hardware, or combinations thereof. Process 300 is shown as a set of acts and is not limited to the order shown for performing the operations of the various acts. Process 300 is an example process for in-swapping sharable memory pages of a process; additional discussions of in-swapping sharable memory pages of a process are included herein with reference to different figures.

In process 300, a determination is made to in-swap sharable memory pages of a process (act 302). In one or more embodiments, this determination is made by the memory manager 102 or policy manager 104, and can be made based on various criteria. Such criteria can include receiving an indication that the process is no longer inactive or suspended, a cessation of those conditions that led to the decision to out-swap in act 202 of FIG. 2, and so forth. Such criteria can include receipt of a request from the process to swap in the process (e.g., to restore a previously recorded save point of the process), a user logging into the system, the process resuming display of a user interface (e.g., the display is no longer minimized), and so forth.

The sharable memory pages of the process are asynchronously prefetched, and the memory pages are added to (placed in) physical memory (act 304). The memory pages can be added to physical memory as they are received, or alternatively may be added to physical memory after all the prefetched sharable memory pages have been received. The sharable memory pages that are asynchronously prefetched are the sharable memory pages that were recorded when previously out-swapping the process (in act 206 of FIG. 2).

In one or more embodiments all of the sharable memory pages recorded in act 206 of FIG. 2 are asynchronously prefetched. Alternatively, only a subset of the sharable memory pages recorded in act 206 of FIG. 2 are asynchronously prefetched.

In one or more embodiments, the sharable memory pages are asynchronously prefetched by adding prefetch I/O requests for the sharable memory pages to an I/O list or queue. These prefetch I/O requests are read requests for the sharable memory pages. The I/O queue is maintained by a module or component of an operating system of the system 100 referred to as a storage stack, which includes at least one driver or other modules allowing communication with the storage device 110. Alternatively, the I/O queue can be maintained by the memory manager 102 or other module or component of an operating system of the system 100. Alternatively, the I/O queue can be maintained by a hardware module or component associated with the storage device, such as a storage device controller (e.g., a disk controller). Each prefetch I/O request identifies one or more of the sharable memory pages, and the prefetch I/O requests are issued to the storage device 110 to retrieve the sharable memory pages from the backing file 112 on the storage device 110. The storage device 110 satisfies the prefetch I/O requests by returning to the memory manager 102 the requested memory pages.

Figure 4:
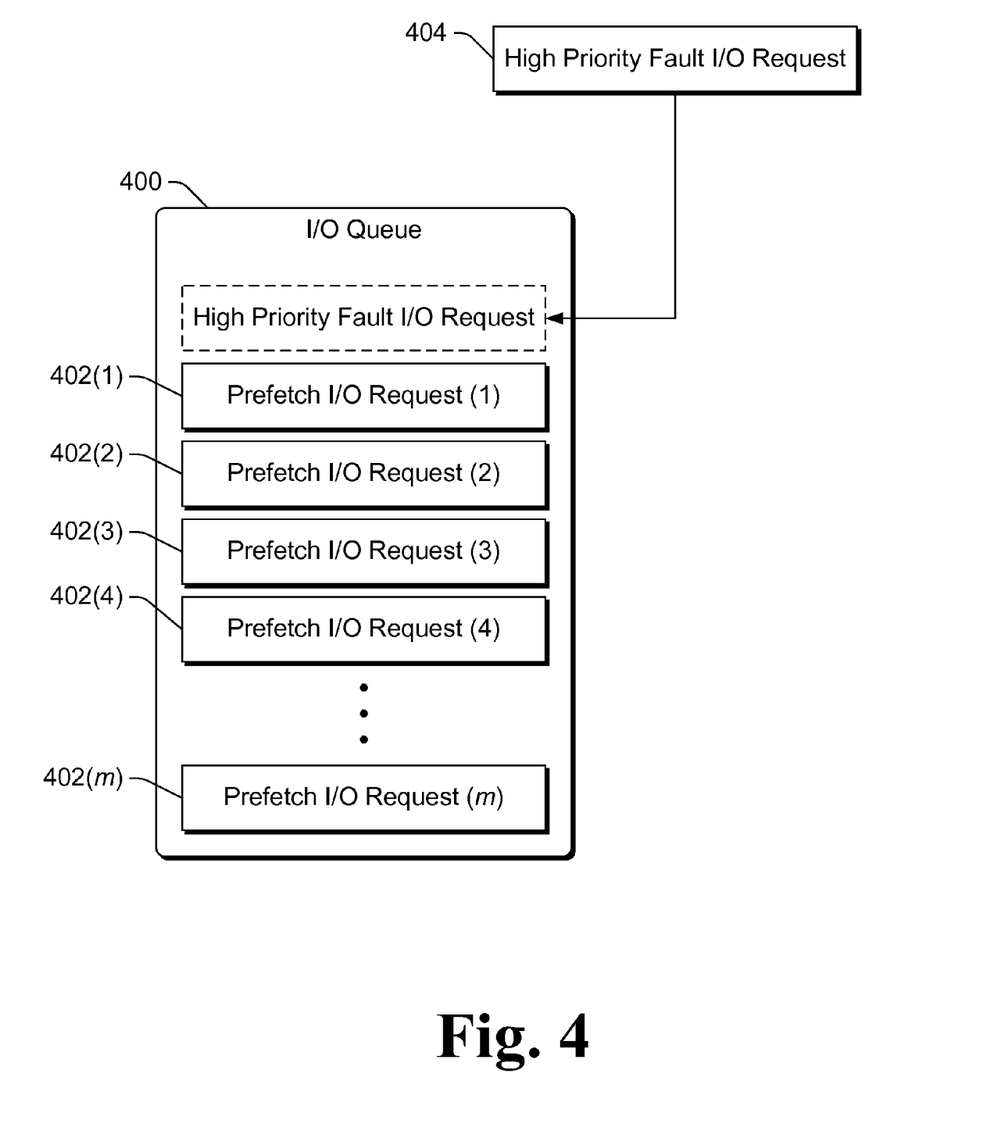
FIG. 4 illustrates an example I/O queue in accordance with one or more embodiments.

FIG. 4 illustrates an example I/O queue 400 in accordance with one or more embodiments. The I/O queue 400 includes multiple (m) prefetch I/O requests 402(1), ..., 402(m). The prefetch I/O requests 402 are issued in order from the front or top of the queue. For example, prefetch I/O request 402(1) is issued prior to issuing prefetch I/O request 402(3). In response to an issued prefetch I/O request, the one or more sharable memory pages identified by the prefetch I/O request are received by the memory manager 102 from the storage device 110, and the memory manager 102 stores the received memory pages in physical memory. Although not illustrated in FIG. 4, other I/O requests from other processes may also be in the I/O queue 400.

The module or component that maintains the I/O queue 400 supports multiple priority levels for I/O requests in the I/O queue 400. Any number of priority levels can be supported, and in one or more embodiments these multiple priority levels include a normal priority and a high priority. High priority I/O requests can be made, for example, only by operating system programs of the system 100 (including modules of the memory manager 102). High priority I/O requests are placed at the front or top of the I/O queue 400, ahead of any other lower priority I/O requests already in the I/O queue 400, or are otherwise handled so that high priority I/O requests are performed and completed prior to lower priority I/O requests. Thus, a high priority I/O request is able to effectively jump to the front of the line, bypassing and being issued before lower priority I/O requests in the I/O queue 400.

Returning to FIG. 3, the process is also allowed to resume running (act 306). The process is being in-swapped, so it is assumed that the process was previously running and out-swapped, so running of the process is resumed. Acts 304 and 306 can be performed in parallel or concurrently, so that the process is allowed to resume running while the sharable memory pages are being asynchronously prefetched. The sharable memory pages are referred to as being asynchronously prefetched because the prefetching of the sharable memory pages does not block the process—the process need not wait for the prefetching of the sharable memory pages to be completed before running.

At some point during the asynchronous prefetching, the process requests a memory page that is not currently in physical memory (act 308). This request can be for a sharable memory page, or alternatively another memory page (e.g., a private memory page). A request for a memory page that is not in physical memory triggers a page fault, which is satisfied by the memory manager 102 retrieving the requested memory page and adding the request memory page to physical memory.

In response to such a request from the process, a high priority I/O request for the requested memory page is added to the I/O queue 400 of FIG. 4 (act 310), and the memory page is added to physical memory when it is received. Because a high priority I/O request is issued for the memory page requested in act 308, the requested memory page is added to physical memory before memory pages received in response to other lower priority I/O requests in the I/O request queue 400 (the asynchronously prefetched memory pages) are added to physical memory.

FIG. 4 illustrates the insertion of a high priority I/O request 404 into the I/O queue 400. The high priority I/O request 404 is placed at the front or top of the I/O queue 400, ahead of the prefetch I/O requests 402.

Returning to FIG. 3, acts 308 and 310 continue until all or at least a threshold amount of the prefetch I/O requests have been issued and the requested memory pages added to physical memory. After all or at least a threshold amount of the prefetch I/O requests have been issued and the requested memory pages added to physical memory, process 300 ends. Thus, subsequent requests for memory pages not currently in physical memory are satisfied by the memory manager 102 using other policies or criteria, and need not be issued at high priority as in act 310.

In one or more embodiments, a limit is placed on the number of high priority I/O requests that can be issued for a process during a particular in-swapping of the pages of the process. This limit helps prevent one process from dominating access to the storage device 110 with its high priority I/O requests.

It should be noted that, by issuing the requests for memory pages not currently in physical memory as high priority I/O requests while the asynchronous prefetch I/O requests are being issued, the prefetching of the sharable memory pages of the process does not block the running of the process. The process does not need to wait for the asynchronous prefetching to be completed in the event the process desires a memory page not currently in physical memory.

For example, the request in act 308 may be for a memory page for which a prefetch I/O request 402 is already in the I/O queue 400, but that has not yet been issued to the storage device 110. In such situations, rather than waiting for the prefetch I/O request that is already in the I/O queue 400 to be issued and the memory page retrieved from the storage device 110, an additional I/O request for the memory page is added to the I/O queue 400. This additional I/O request, however, is a high priority I/O request (e.g., act 310). Thus, the memory page is retrieved and added to physical memory without waiting for the prefetch I/O request to be issued and completed from the storage device 110, and the process does not have to wait for the prefetch I/O request to be issued to the storage device 110. The prefetch I/O request can remain in the I/O queue 400 and issued to the storage device 110, but the memory pages that are retrieved in response to the prefetch I/O request can be dropped or otherwise ignored (because the memory page is already in physical memory). Alternatively, the memory pages that are retrieved in response to the prefetch I/O request can be handled in other manners, such as copying the memory pages into memory, updating the page table entries to point to the memory pages that are retrieved in response to the prefetch I/O request rather than memory page already in physical memory, and so forth.

The request in act 308 may alternatively be for a memory page for which a prefetch I/O request is not already in the I/O queue 400. Such a request can be, but need not be, a request for a sharable memory page. In such situations, a high priority I/O request for the memory page is added to the I/O queue 400 (e.g., act 310). The high priority I/O request is issued prior to lower priority I/O requests, so the memory page is retrieved and added to physical memory without waiting for lower priority I/O requests in the I/O queue 400 to be issued to the storage device 110. Thus, the process gets access to the requested page in physical memory more quickly than if the process had to wait for all the I/O requests in the I/O queue 400 to be satisfied.

It should be noted that the storage device 110, or a storage controller associated with the storage device 110, may itself have a queue that holds I/O requests. In such situations, a high priority I/O request issued to the storage device 110 may be placed in the I/O queue of the storage device 110 behind lower priority I/O requests. Such lower priority I/O requests would be satisfied by the storage device 110 prior to the high priority I/O request. Alternatively, if the storage device 110 or storage controller supports high priority I/O requests, the storage device 110 or storage controller can also put the high priority I/O request at the top or front of its queue.

It should also be noted that the techniques discussed herein may provide different performance when in-swapping memory pages of a process based on the type of storage device 110. For example, in-swapping memory pages of a process using the techniques discussed herein may be performed faster using flash memory types of storage devices than rotational media (e.g., magnetic disk) types of devices. This performance difference can be due to the seek time involved in reading different parts of the storage device. The techniques discussed herein can thus be an optional configuration parameter, with a user or administrator being able to select whether sharable memory pages are to be recorded and allowed to be repurposed when out-swapping memory pages of a process (and thus whether sharable memory pages are to be asynchronously prefetched when in-swapping memory pages of a process). Alternatively, the configuration parameter can be automatically set (e.g., by the memory manager 102 or the policy manager 104) based on determined performance characteristics of the storage device 110. These performance characteristics of the storage device 110 can be determined in different manners, such as automatically determined by an operating system of the device, provided by another device or service, and so forth.

The techniques discussed herein support various usage scenarios. Memory pages of a process on a computing device can be swapped out, such as when the process is suspended, to free physical memory for other processes. The ability to repurpose sharable memory pages allows additional physical memory to be freed beyond that which can be freed by repurposing private memory pages. When the process is resumed, the memory pages used by or assigned to the process can be quickly and efficiently returned to physical memory. Sharable memory pages are asynchronously prefetched in parallel with the process running, and care is taken to prevent page faults (the process requesting memory pages that are not in physical memory) from blocking the running of the process. This way, the system is proactively bringing in memory pages that the process is very likely to use (e.g., memory pages that were in its working set when suspended) without forcing the process to wait for all of this proactive prefetching to complete synchronously (which in turn would block the process resume experience).

Figure 5:
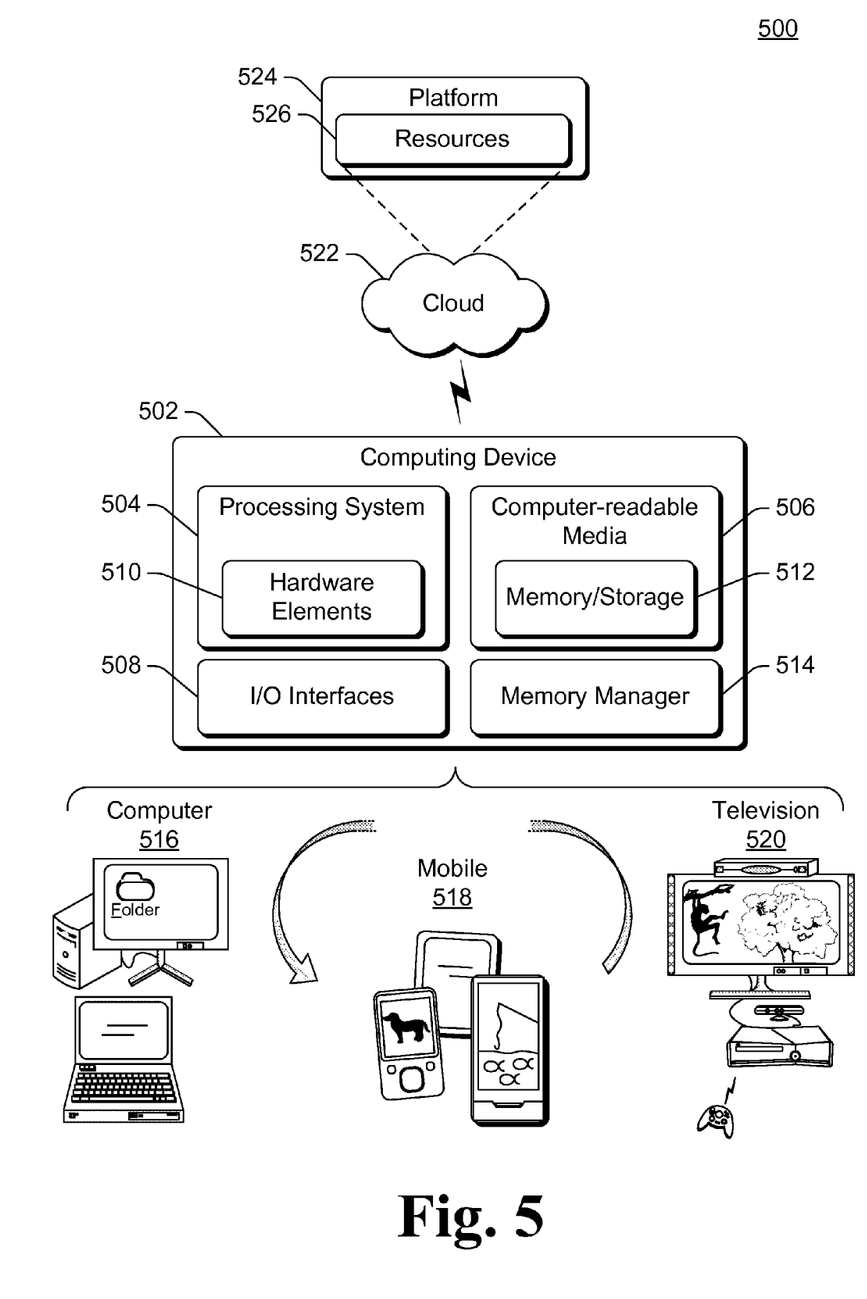
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Computing device 502 also includes a memory manager 514. Memory manager 514 provides various asynchronous prefetching for sharable memory pages functionality as discussed above. Memory manager 514 can implement, for example, the memory manager 102 of FIG. 1. Although illustrated as separate from the computer-readable media 506, it should be noted that the memory manager 514 can alternatively be implemented as part of the computer-readable media 506.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   identifying one or more candidate sharable memory pages for a process of the computing device being swapped from memory, the one or more candidate sharable memory pages comprising sharable memory pages in a working set of the process and memory pages sharable by the process with one or more other processes of the computing device;
   maintaining a record identifying the one or more candidate sharable memory pages;

removing the one or more candidate sharable memory pages from the working set of the process;

allowing a memory manager to repurpose the one or more candidate sharable memory pages after the one or more candidate sharable memory pages have been recorded and after removing the one or more candidate sharable memory pages from the working set of the process;

asynchronously prefetching, after performing the identifying, the maintaining, and the allowing, the one or more candidate sharable memory pages identified by the record, the asynchronously prefetching including adding I/O requests for the one or more candidate sharable memory pages to an I/O queue;

receiving, while performing the asynchronously prefetching, a request for a memory page that is not in physical memory and for which an I/O request is already present in the I/O queue, the request for the memory page that is not in the physical memory causing a page fault; and adding, in response to the request for the memory page causing the page fault, a high priority I/O request to the I/O queue, the adding comprising placing the high priority I/O request at a front or top of the I/O queue ahead of other lower priority I/O requests.

2. A method as recited in claim 1, the allowing comprising allowing the memory manager to repurpose modified ones of the one or more candidate sharable memory pages after the modified ones of the one or more candidate sharable memory pages have been written to a backing file.

3. A method as recited in claim 1, further comprising, after performing the identifying, the maintaining, and the allowing:
determining to swap the process into memory.

4. A method as recited in claim 1, the method further comprising:
issuing the high priority I/O request prior to the other lower priority I/O requests in the I/O queue;
adding to physical memory the memory page received in response to the high priority I/O request; and
allowing the I/O request already present in the I/O queue to issue.

5. A method as recited in claim 1, the method further comprising:
receiving, while performing the asynchronously prefetching, a request for a memory page that is not in physical memory and for which an I/O request is not already present in the I/O queue;
issuing the high priority I/O request prior to the other lower priority I/O requests in the I/O queue; and
adding to physical memory the memory page received in response to the high priority I/O request.

6. A method as recited in claim 1, further comprising allowing the process to resume running in parallel with asynchronously prefetching the identified one or more candidate sharable memory pages.

7. A method as recited in claim 1, further comprising:
performing the identifying, the maintaining, and the allowing in response to a determination to suspend the process; and
performing the asynchronously prefetching in response to a determination to resume the process after suspension of the process.

8. A method as recited in claim 1, the record identifying the one or more candidate sharable memory pages comprising a list of virtual addresses of the candidate sharable memory pages.

9. A computing device comprising:
a memory;
a storage device; and
a memory manager configured to:
swap a process of the computing device into the memory, the process using one or more sharable memory pages that are sharable with other processes of the computing device,
allow the process to resume running, and
asynchronously prefetch the one or more sharable memory pages, the process not waiting for the asynchronous prefetch of the one or more sharable memory pages to be completed before running and the asynchronous prefetch being performed while the process is running.

10. A computing device as recited in claim 9, the one or more sharable memory pages comprising sharable memory pages in a working set of the process.

11. A computing device as recited in claim 9, the memory manager being further configured to identify the one or more sharable memory pages by accessing a record of candidate sharable memory pages of the process generated when the process was previously swapped out of the memory.

12. A computing device as recited in claim 11, the record of candidate sharable memory pages comprising a list of virtual addresses of the candidate sharable memory pages.

13. A computing device as recited in claim 9, the memory manager being configured to asynchronously prefetch the one or more sharable memory pages by adding I/O requests to read the one or more sharable memory pages to an I/O queue, the memory manager being further configured to:
receive, while performing the asynchronous prefetch, a request for a memory page that is not in the memory and for which an I/O request is already present in the I/O queue;
add, in response to the request for the memory page, a high priority I/O request to the I/O queue so that the high priority I/O request is issued prior to other lower priority I/O requests in the I/O queue;
add the memory page received in response to the high priority I/O request to the memory; and
allow the I/O request already present in the I/O queue to issue.

14. A computing device as recited in claim 9, the memory manager being configured to asynchronously prefetch the one or more sharable memory pages by adding I/O requests to read the one or more sharable memory pages to an I/O queue, the memory manager being further configured to:
receive, while performing the asynchronous prefetch, a request for a memory page that is not in the memory and for which an I/O request is not already present in the I/O queue;
add, in response to the request for the memory page, a high priority I/O request to the I/O queue so that the high priority I/O request is issued prior to other lower priority I/O requests in the I/O queue; and
add the memory page received in response to the high priority I/O request to the memory.

15. A computing device as recited in claim 10, the memory manager being configured to swap the process of the computing device into the memory in response to a determination to resume the process after suspension of the process.

16. A computing device as recited in claim 10, the memory manager being further configured to:
swap the process out from the memory;
identify the one or more sharable memory pages of the process;

maintain a record identifying the one or more sharable pages of the process; and allow the one or more sharable memory pages to be repurposed after the one or more sharable pages have been recorded.

17. A computing device as recited in claim 16, the memory manager being configured to allow the one or more sharable memory pages to be repurposed comprising the memory manager being configured to allow modified ones of the one or more sharable memory pages to be repurposed after the modified ones of the one or more sharable memory pages have been written to a backing file.

18. A computing device as recited in claim 16, the memory manager being configured to determine to swap the process of the computing device out from the memory in response to a determination to suspend the process.

19. A computing device comprising:
one or more processors; and
one or more computer-readable storage media devices having stored thereon multiple instructions that, responsive to execution by the one or more processors, cause the one or more processors to perform operations comprising:
in response to a determination to swap a process of the computing device from memory due to the process being suspended,
identifying one or more sharable memory pages in a working set of the process, the one or more sharable memory pages comprising memory pages sharable by the process with one or more other processes of the computing device,
maintaining a record identifying the one or more sharable memory pages, and
allowing a memory manager to repurpose the one or more sharable memory pages after the one or more sharable memory pages have been recorded; and
in response to, subsequent to the determination to swap the process from memory, a determination to swap the process of the computing device into the memory due to the process being resumed,
allowing the process to resume running,
asynchronously prefetching the one or more sharable memory pages while the process is running, the asynchronously prefetching including adding I/O requests for the one or more sharable memory pages to an I/O queue;
receiving, while performing the asynchronously prefetching, a request for a memory page that is not in physical memory and for which an I/O request is already present in the I/O queue, the request for the memory page that is not in the physical memory causing a page fault and adding, in response to the request for the memory page causing the page fault, a high priority I/O request to the I/O queue, the adding comprising placing the high priority I/O request at a front or top of the I/O queue ahead of other lower priority I/O requests.

20. A method as recited in claim 1, the record identifying the one or more candidate sharable memory pages including at least one of a list of working set pages, a list of standby pages, a list of modified pages, and a list of free pages, and the allowing comprising adding the one or more candidate sharable memory pages to the list of the standby pages or the list of free pages after the removing the one or more candidate sharable memory pages from the working set of the process.

* * * * *